US009713164B2

(12) United States Patent
Gupta et al.

(10) Patent No.: US 9,713,164 B2
(45) Date of Patent: Jul. 18, 2017

(54) USER EQUIPMENT INITIATED DISCONTINUOUS OPERATION IN A WIRELESS COMMUNICATIONS NETWORK

(75) Inventors: Maruti Gupta, Portland, OR (US); Rath Vannithamby, Portland, OR (US); Puneet Jain, Hillsboro, OR (US); Ali Taha Koc, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 14/127,805

(22) PCT Filed: Jun. 28, 2012

(86) PCT No.: PCT/US2012/044670
§ 371 (c)(1),
(2), (4) Date: Apr. 21, 2014

(87) PCT Pub. No.: WO2013/006381
PCT Pub. Date: Jan. 10, 2013

(65) Prior Publication Data
US 2014/0226542 A1    Aug. 14, 2014

Related U.S. Application Data

(60) Provisional application No. 61/504,054, filed on Jul. 1, 2011.

(51) Int. Cl.
*H04W 52/02* (2009.01)
*H04W 72/02* (2009.01)
(Continued)

(52) U.S. Cl.
CPC ...... *H04W 72/1215* (2013.01); *H04B 7/0697* (2013.01); *H04B 15/00* (2013.01);
(Continued)

(58) Field of Classification Search
CPC ...... H04B 15/00; H04B 7/0697; Y02B 60/50; H04L 27/362; H04L 1/0025;
(Continued)

(56) References Cited

U.S. PATENT DOCUMENTS 8,953,509 B2    2/2015  Lee et al.
8,989,042 B2    3/2015  Chou et al.
(Continued)

FOREIGN PATENT DOCUMENTS

CN    103999515 A    8/2014
JP    2006270296 A    10/2006
(Continued)

OTHER PUBLICATIONS

Nokia Simens Network, "Analysis on sending the MTC indicator to the network in Release 10", 3GPP TSG SA WG2 Meeting #82, Nov. 15-19, 2010. pages 1-6.*
(Continued)

*Primary Examiner* — Andrew Lai
*Assistant Examiner* — Albert Shih
(74) *Attorney, Agent, or Firm* — Schwegman Lundberg & Woessner, P.A.

(57) ABSTRACT

An apparatus and method for initiating discontinuous reception (DRX) operation in a user equipment (UE) are disclosed herein. Applications running on the UE are monitored by the UE to identify one or more inactivity trigger events associated with the application(s). The UE includes an application-radio cross layer to process the application information, including the inactivity trigger event, for use by a radio layer. The radio layer of the UE determines initiation of the DRX operation in accordance with the application information, including the inactivity trigger event, provided by the application-radio cross layer and device characteristics information.

20 Claims, 4 Drawing Sheets

(51) Int. Cl.

| | | |
|---|---|---|
| H04W 76/02 | (2009.01) | |
| H04W 4/00 | (2009.01) | |
| H04L 5/14 | (2006.01) | |
| H04W 72/12 | (2009.01) | |
| H04W 72/08 | (2009.01) | |
| H04W 88/06 | (2009.01) | |
| H04B 7/06 | (2006.01) | |
| H04L 1/06 | (2006.01) | |
| H04W 72/04 | (2009.01) | |
| H04B 15/00 | (2006.01) | |
| H04W 8/02 | (2009.01) | |
| H04W 24/00 | (2009.01) | |
| H04W 52/24 | (2009.01) | |
| H04L 5/00 | (2006.01) | |
| H04L 27/34 | (2006.01) | |
| H04W 52/14 | (2009.01) | |
| H04W 24/08 | (2009.01) | |
| H04W 76/04 | (2009.01) | |
| H04L 27/36 | (2006.01) | |
| H04L 1/00 | (2006.01) | |
| H04W 52/32 | (2009.01) | |
| H04W 84/04 | (2009.01) | |

(52) U.S. Cl.
CPC .......... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/242* (2013.01); *H04W 52/244* (2013.01); *H04W 72/02* (2013.01); *H04W 72/04* (2013.01); *H04W 72/042* (2013.01); *H04W 72/082* (2013.01); *H04W 72/1278* (2013.01); *H04W 76/028* (2013.01); *H04W 76/048* (2013.01); *H04W 88/06* (2013.01); *H04L 1/0025* (2013.01); *H04L 27/362* (2013.01); *H04W 52/325* (2013.01); *H04W 84/042* (2013.01); *Y02B 60/50* (2013.01)

(58) Field of Classification Search
CPC ....... H04L 1/0041; H04L 1/0045; H04L 1/06; H04L 27/34; H04L 5/14; H04L 5/0037; H04W 8/02; H04W 52/244; H04W 24/00; H04W 72/042; H04W 4/005; H04W 52/0251; H04W 72/02; H04W 76/028; H04W 52/00
USPC .......................................... 370/280, 281, 311
See application file for complete search history.

(56) References Cited

U.S. PATENT DOCUMENTS

| | | |
|---|---|---|
| 2007/0287468 A1 | 12/2007 | Jeong et al. |
| 2007/0291673 A1 | 12/2007 | Demirhan et al. |
| 2008/0181127 A1 | 7/2008 | Terry et al. |
| 2008/0232310 A1 | 9/2008 | Xu |
| 2009/0238098 A1* | 9/2009 | Cai ............... H04W 76/048 370/254 |
| 2010/0118752 A1* | 5/2010 | Suzuki ............ H04W 76/048 370/311 |
| 2010/0255835 A1 | 10/2010 | Suzuki et al. |
| 2010/0309798 A1* | 12/2010 | Fodor ............... H04W 52/06 370/252 |
| 2011/0136530 A1 | 6/2011 | Deshpande |
| 2011/0199951 A1 | 8/2011 | Kwon et al. |
| 2011/0243047 A1 | 10/2011 | Dayal et al. |
| 2012/0033597 A1 | 2/2012 | Kim et al. |
| 2012/0106424 A1 | 5/2012 | Davies et al. |
| 2012/0115552 A1 | 5/2012 | Bhattacharya |
| 2012/0120828 A1 | 5/2012 | Anderson et al. |
| 2012/0120843 A1 | 5/2012 | Anderson et al. |
| 2012/0164954 A1* | 6/2012 | Karampatsis ........ H04W 4/005 455/67.11 |
| 2012/0236834 A1 | 9/2012 | Ho et al. |
| 2012/0320811 A1 | 12/2012 | Islam et al. |
| 2013/0083713 A1 | 4/2013 | Johansson et al. |
| 2013/0107727 A1 | 5/2013 | Lunden et al. |
| 2013/0155928 A1 | 6/2013 | Yu et al. |
| 2013/0194991 A1 | 8/2013 | Vannithamby et al. |
| 2014/0112221 A1 | 4/2014 | Verger et al. |
| 2014/0119255 A1 | 5/2014 | Vannithamby et al. |

FOREIGN PATENT DOCUMENTS

| | | |
|---|---|---|
| JP | 2010508704 A | 3/2010 |
| JP | 2010526495 A | 7/2010 |
| JP | 2010538506 A | 12/2010 |
| WO | WO-2007082934 A1 | 7/2007 |
| WO | WO-2010054391 A2 | 5/2010 |
| WO | WO-2013006381 A3 | 5/2013 |
| WO | WO-2013112733 A1 | 8/2013 |

OTHER PUBLICATIONS

"Analysis on sending the MTC Indicator to the network in Release 10", Nokia Siemens Networks, Nokia, 3GPP TSG SA WG2 Meeting #82 TD S2-105744, TD C1-104835, (Nov. 9, 2010), 6 pgs.
"U.S. Appl. No. 13/626,409, Advisory Action mailed Jan. 23, 2015", 4 pgs.
"U.S. Appl. No. 13/626,409, Examiner Interview Summary mailed Jul. 9, 2015", 3 pgs.
"U.S. Appl. No. 13/626,409, Final Office Action mailed Aug. 29, 2014", 25 pgs.
"U.S. Appl. No. 13/626,409, Non Final Office Action mailed Mar. 18, 2015", 22 pgs.
"U.S. Appl. No. 13/626,409, Non Final Office Action mailed Mar. 24, 2014", 20 pgs.
"U.S. Appl. No. 13/626,409, Notice of Allowance mailed Aug. 19, 2015", 9 pgs.
"U.S. Appl. No. 13/626,409, Response filed Jan. 7, 2015 to Final Office Action mailed Aug. 29, 2014", 12 pgs.
"U.S. Appl. No. 13/626,409, Response filed Jun. 24, 2014 to Non Final Office Action mailed Mar. 24, 2014", 12 pgs.
"U.S. Appl. No. 13/626,409, Response filed Jul. 2, 2015 to Non Fianl Office Action mailed Mar. 18, 205", 11 pgs.
"Australian Application Serial No. 2013212110, First Examiners Report mailed Feb. 10, 2015", 6 pgs.
"Australian Application Serial No. 2013212110, Response filed Jul. 16, 2015 to First Examiners Report mailed Feb. 10, 2015", 25 pgs.
"European Application Serial No. 12807773.2, Extended European Search Report mailed Feb. 17, 2015", 6 pgs.
"International Application Serial No. PCT/US2012/044670, International Preliminary Report on Patentability mailed Jan. 16, 2014", 6 pgs.
"International Application Serial No. PCT/US2013/022985, International Preliminary Report on Patentability mailed Aug. 7, 2014", 7 pgs.
"Japanese Application Serial No. 2014-519030, Office Action mailed Jan. 27, 2015", w/ English Translation, 9 pgs.
"Japanese Application Serial No. 2014-519030, Response filed Apr. 24, 2015 to Office Action mailed Jan. 27, 2015", W/ English Claims, 13 pgs.
"Japanese Application Serial No. 2014-553550, Office Action mailed Jun. 30, 2015", W/ English Translation, 6 pgs.

(56) References Cited

OTHER PUBLICATIONS

"Korean Application Serial No. 2014-7002377, Non Final Office Action Apr. 2, 2015", W/ English Translation, 17 pgs.
"Korean Application Serial No. 2014-7002377,Response filed Jun. 2, 2015 Non Final Office Action Apr. 2, 2015", W/ English Claims, 22 pgs.
"Korean Application Serial No. 10-2014-7020673, Office Action mailed Jun. 17, 2015", W/ English Translation, 10 pgs.
Bontu, C, et al., "DRX mechanism for power saving in LTE", IEEE Communications Magazine, IEEE Service Center, Piscataway, US, vol. 47, No. 6, (Jun. 1, 2009), 48-55.
Intel Corporation, "LTE Fast Dormancy", 3GGP TSG-RAN WG2 Meeting #72 R2-106825, [Online] retrieved from the internet: <http://www.3gpp.org/ftp/tsg_ran/WG2_RL2/TSGR2_72/Docs/R2-106285.zip>, (Nov. 10, 2010).
Nokia, "DRX parameter negotiation in PDP Context activation/modification/deactivation", 3GPP TSG-SA WG2#30 S2-030543, [Online] retrieved from the internet: <http://www.3gpp.org/ftp/tsg_sa/WG2_Arch/TSGS2_30_Milan/tdocs/S2-030543.zip>, (Mar. 2, 2003).
"International Application Serial No. PCT/US2012/044670, International Search Report mailed Jan. 29, 2013", 3 pgs.
"International Application Serial No. PCT/US2012/044670, Written Opinion mailed Jan. 29, 2013", 4 pgs.
"International Application Serial No. PCT/US2013/022985, International Search Report mailed Apr. 1, 2013", 3 pgs.
"International Application Serial No. PCT/US2013/022985, Written Opinion mailed Apr. 1, 2013", 5 pgs.

\* cited by examiner

USER EQUIPMENT INITIATED DISCONTINUOUS OPERATION IN A WIRELESS COMMUNICATIONS NETWORK

CROSS-REFERENCE TO RELATED APPLICATIONS

This application is a U.S. National Stage Filing under 35 U.S.C. 371 from International Application Number PCT/US2012/044670, filed on Jun. 28, 2012, and published as WO 2013/006381 A2 on Jan. 10, 2013, which application claims priority to U.S. Provisional Patent Application No. 61/504,054, entitled "Method and Apparatus for LTE" filed on Jul. 1, 2011, the content of which applications and publication are incorporated herein by reference in their entirety.

TECHNICAL FIELD

The present disclosure relates generally to wireless communications. More particularly, the present disclosure relates to user equipment initiated operations within wireless communication systems.

BACKGROUND

Devices operating within a wireless data communications network expend significant power to receive instructions and data and perform associated signal processing. As wireless data communications networks increase data rates, the power consumption of devices is also increasing. For mobile devices, which are typically powered by a limited power source in the form of batteries, a design goal is to achieve battery power conservation without adversely affecting active operation requirements.

One way for devices to conserve power (and reduce signaling overhead) in current 3rd Generation Partnership Project (3GPP) long term evolution (LTE)-Advanced systems is to implement discontinuous reception (DRX) operation. DRX operation involves reducing the transceiver duty cycle of the device. An enhanced node B (eNodeB) within a 3GPP-LTE system instructs one or more devices within its serving area to initiate DRX operation based on meeting a pre-determined inactivity timer value specified by the eNodeB. The eNodeB also instructs the device(s) as to a particular DRX duty cycle (e.g., when a device should be "on" to receive scheduling and paging information and/or data, and when the device should be "off" to conserve power usage). Only the eNodeB can initiate DRX operation. Current 3GPP LTE-Advanced systems do not support initiation of DRX operation by user equipment (UE) devices.

DETAILED DESCRIPTION

The following description is presented to enable any person skilled in the art to create and use a computer system configuration and related method and article of manufacture to determine and initiate discontinuous reception (DRX) operation by a user equipment (UE) operating in a wireless communications network. The protocol stack of the UE includes new components to identify inactivity trigger events associated with applications running on the UE and/or device characteristics of the UE (non-access stratum (NAS) parameters), facilitate access to the inactivity trigger events by a radio resource control/medium access control (RRC/MAC) layer, and for the RRC/MAC layer to determine whether to initiate DRX operation (and optionally, to select a particular DRX duty cycle or other DRX parameters). The UE signals intent to trigger DRX operation to its associated eNodeB using radio resource control (RRC) signaling included in radio frame(s), and in response to receiving confirmation from the eNodeB, switches to DRX mode. Hence, UE achieves power savings, reduces battery consumption, and/or reduction in signaling overhead over the air interface from smart idle mode implementation. The UE suggests one or more DRX parameters to the eNodeB based on its actual operating state and/or device characteristics.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
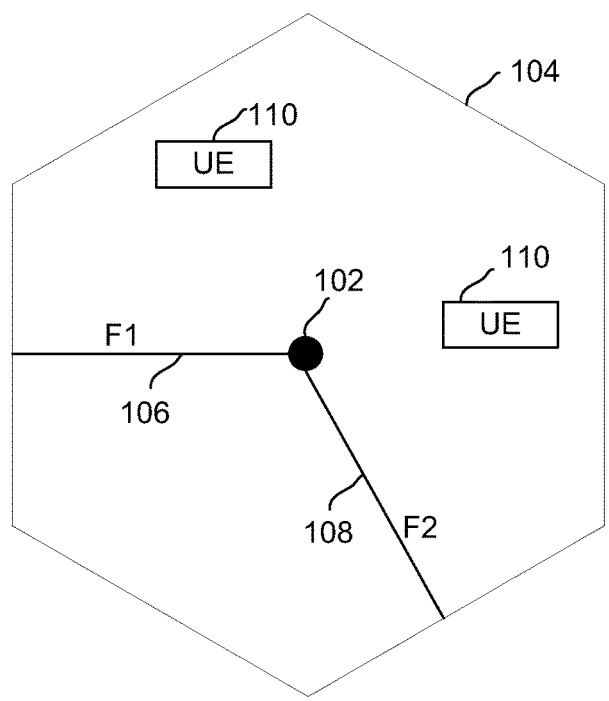
FIG. 1 illustrates an example (portion) of a wireless communications network according to some embodiments.

FIG. 1 illustrates an example (portion) of a wireless communications network 100 according to some embodiments. The wireless communications network 100 includes an enhanced Node B (eNodeB or eNB) 102 and a plurality of user equipments (UEs) 110. In one embodiment, the wireless communications network 100 comprises an evolved universal terrestrial radio access network (EUTRAN) using the 3rd Generation Partnership Project (3GPP) long term evolution (LTE) standard operating in time division duplex (TDD) mode. In another embodiment, the wireless communications network 100 comprises a EUTRAN using the 3GPP-LTE standard operating in frequency division duplex (FDD) mode. In still other embodiments, the wireless communications network 100 can be a Wi-Fi network, a WiMax network, a 3rd generation (3G) network, and other wireless data communications networks.

The eNodeB 102 (also referred to as a base station) serves a certain geographic area, denoted as a cell 104. The UEs 110 located within the cell 104 are served by the eNodeB 102. The eNodeB 102 communicates with the UEs 110 on a first carrier frequency 106 (F1) (e.g., the primary carrier component) and optionally, one or more secondary carrier frequencies, such as a second carrier frequency 108 (F2) (e.g., the secondary carrier component). For ease of illustration, only a single eNodeB is shown in FIG. 1. However, it is understood that the wireless communications network 100 includes more than one eNodeB, each of the eNodeBs serving a particular cell which may or may not neighbor the eNodeB 102.

The UEs 110 may comprise a variety of devices including, but not limited to, cellular telephones, smart phones, tablets, laptops, desktops, personal computers, servers, personal digital assistants (PDAs), web appliances, set-top box (STB), a network router, switch or bridge, and the like. One or more UEs 110 may move into or out of the cell 104 at any given time.

Figure 2:
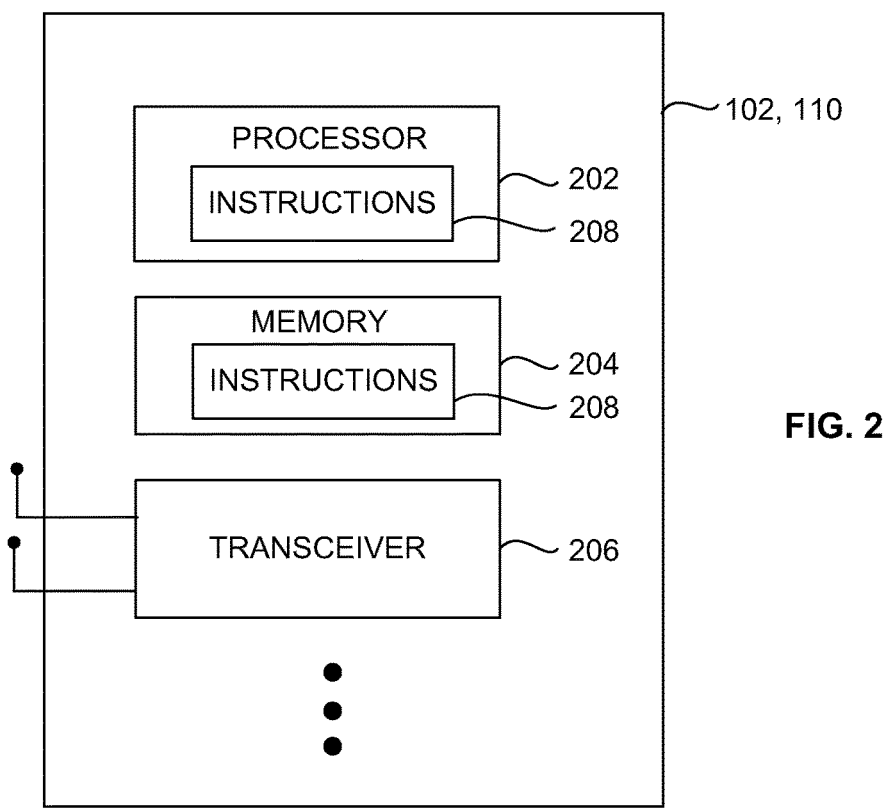
FIG. 2 illustrates an example block diagram showing details of the eNodeB and any of the UEs according to some embodiments.

FIG. 2 illustrates an example block diagram showing details of the eNodeB 102 and any of the UEs 110 according to some embodiments. The eNodeB 102/UE 110 includes a processor 202, a memory 204, a transceiver 206, instructions 208, and other components (not shown). The processor 202 comprises one or more central processing units (CPUs), graphics processing units (GPUs), or both. The processor 202 is configured to provide processing and control functionalities for the eNodeB 102/UE 110. The memory 204 comprises one or more transient and static memory units configured to store instructions, data, setting information, and the like for the eNodeB 102/UE 110. The transceiver 206 comprises one or more transceivers configured to receive uplink receptions and transmit downlink transmissions between the eNodeB 102 and the UEs 110 within range of the eNodeB 102. The transceiver 206 includes one or more multiple-input and multiple-output (MIMO) antenna to support MIMO communications. In some MIMO embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

The instructions 208 comprises one or more sets of instructions or software executed on a computing device (or machine) to cause such computing device (or machine) to perform any of the methodologies discussed herein. The instructions 208 (also referred to as computer-readable instructions, machine-readable instructions, modules, components, or apps) may reside, completely or at least partially, within the processor 202 and/or memory 204 during execution thereof. The processor 202 and memory 204 also comprise machine-readable media. In one embodiment, the processor 202 is configured to execute the instructions 208 to facilitate operations associated with initiating discontinuous reception (DRX) operation by one or more UEs 110, as described in detail below.

Although the eNodeB 102/UE 110 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 110 may be configured with the instructions to perform the operations described herein.

In some embodiments, the UE 110 may be configured to receive Orthogonal Frequency Division Multiplex (OFDM) communication signals over a multicarrier communication channel in accordance with an OFDMA communication technique. In some embodiments, the OFDMA technique may be either a frequency domain duplexing (FDD) technique that uses different uplink and downlink spectrum or a time domain duplexing (TDD) technique that uses the same spectrum for uplink and downlink. The OFDM signals may comprise a plurality of orthogonal subcarriers. In some broadband multicarrier embodiments, eNodeB 102 may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 110 and the eNodeB 102 may be configured to communicate in accordance with an orthogonal frequency division multiple access (OFDMA) technique. The UTRAN LTE standards include the 3rd Generation Partnership Project (3GPP) standards for UTRAN-LTE, Release 8, March 2008, and Release 10, December 2010, including variations and evolutions thereof.

The UEs 110 located in the cell 104 transmit data to the eNodeB 102 (uplink transmission) and receive data from the eNodeB 102 (downlink transmission) using radio frames comprising Orthogonal Frequency-Division Multiple Access (OFDMA) frames configured for TDD operations or FDD operations. Each of the radio frames comprises a plurality of uplink and downlink subframes, the uplink and downlink subframes configured in accordance with the uplink-downlink ratio configuration selected from among the supported uplink-downlink ratio configurations. (See 3GPP TS 36.211 Version 9.1.0, E-UTRA Physical Channels and Modulation (Release 9), March 2010.)

Figure 3:
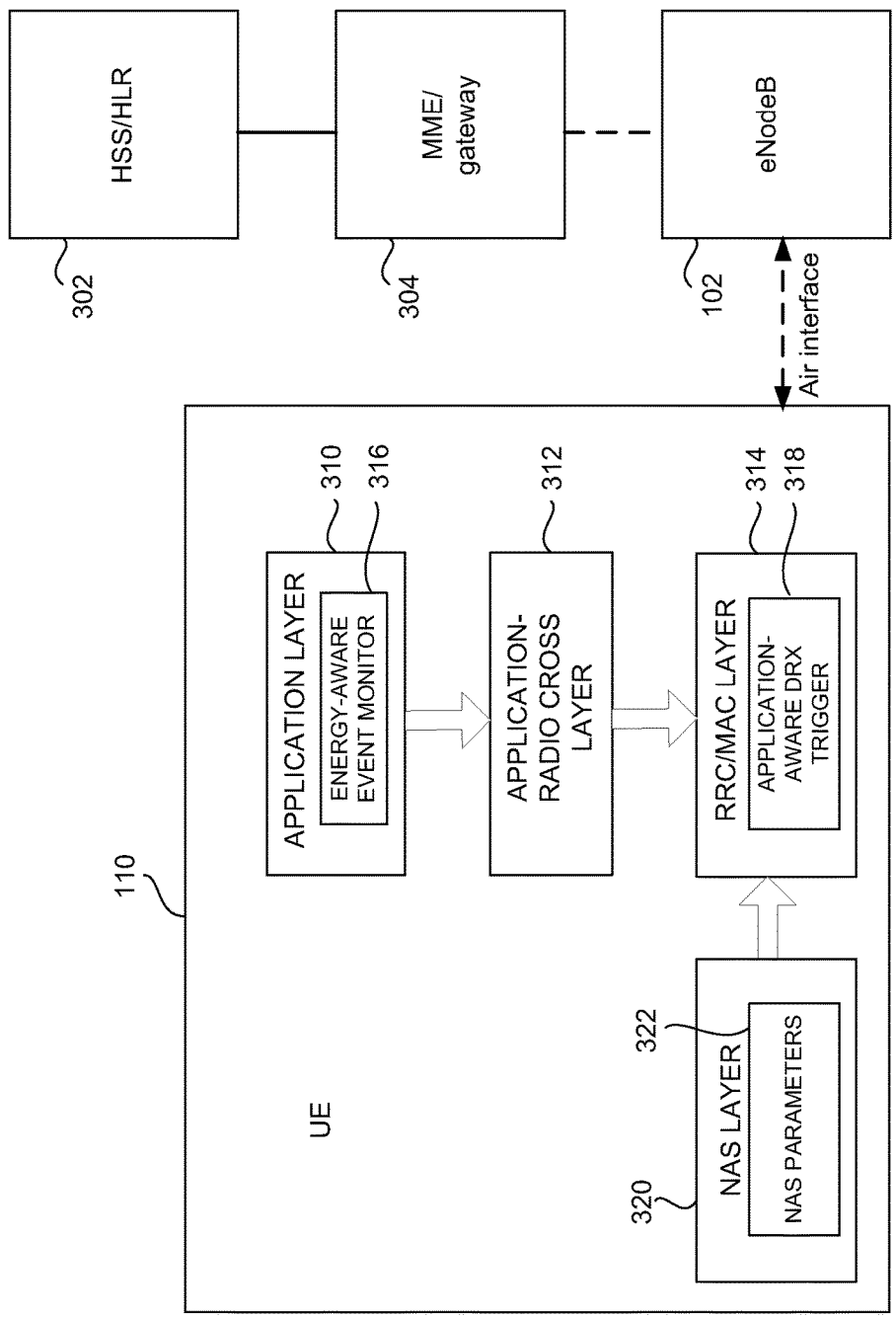
FIG. 3 illustrates at least a portion of a protocol stack associated with an UE according to some embodiments.

FIG. 3 illustrates at least a portion of a protocol stack associated with each UE 110 according to some embodiments. The protocol stack of each of the UEs 110 includes an application layer 310, an application-radio cross layer 312, a radio resource control/medium access control (RRC/MAC) layer 314, and a non-access stratum (NAS) layer 320. Data is communicated from the application layer 310 to the application-radio cross layer 312, and data is communicated from each of the application-radio cross layer 312 and the NAS layer 320 to the RRC/MAC layer 314. The application layer 310 includes an energy-aware event monitor component 316. The RRC/MAC layer 314 includes an application-aware DRX trigger component 318. The NAS layer 320 includes a NAS parameters component 322.

The UE 110 wirelessly communicates with the eNodeB 102 via an air interface. A mobility management entity (MME)/gateway 304 is provided in the communication path between the eNodeB 102 and a home subscriber server (HSS)/home location register (HLR) 302. The eNodeB 102 wirelessly communicates with the MME/gateway 304. The MME/gateway 304 communicates with the HSS/HLR 302. MME/gateway 304 (also referred to as the MME 304) comprises a control node for the wireless communications network 100 that is configured to, among other things, control access to HSS/HLR 302. HSS/HLR 302 comprises a master repository of subscriber information, account information, UE information, service information, and/or other information relating to devices operating within the wireless communications network 100. For example, the stored information can include account numbers, user preferences, user permissions, network permissions, UE characteristics or specifications, and the like. MME/gateway 304 mediates accessing, for example, UE characteristics stored in the HSS/HLR 302 in response to a request from the UE 110 for such information.

Figure 4:
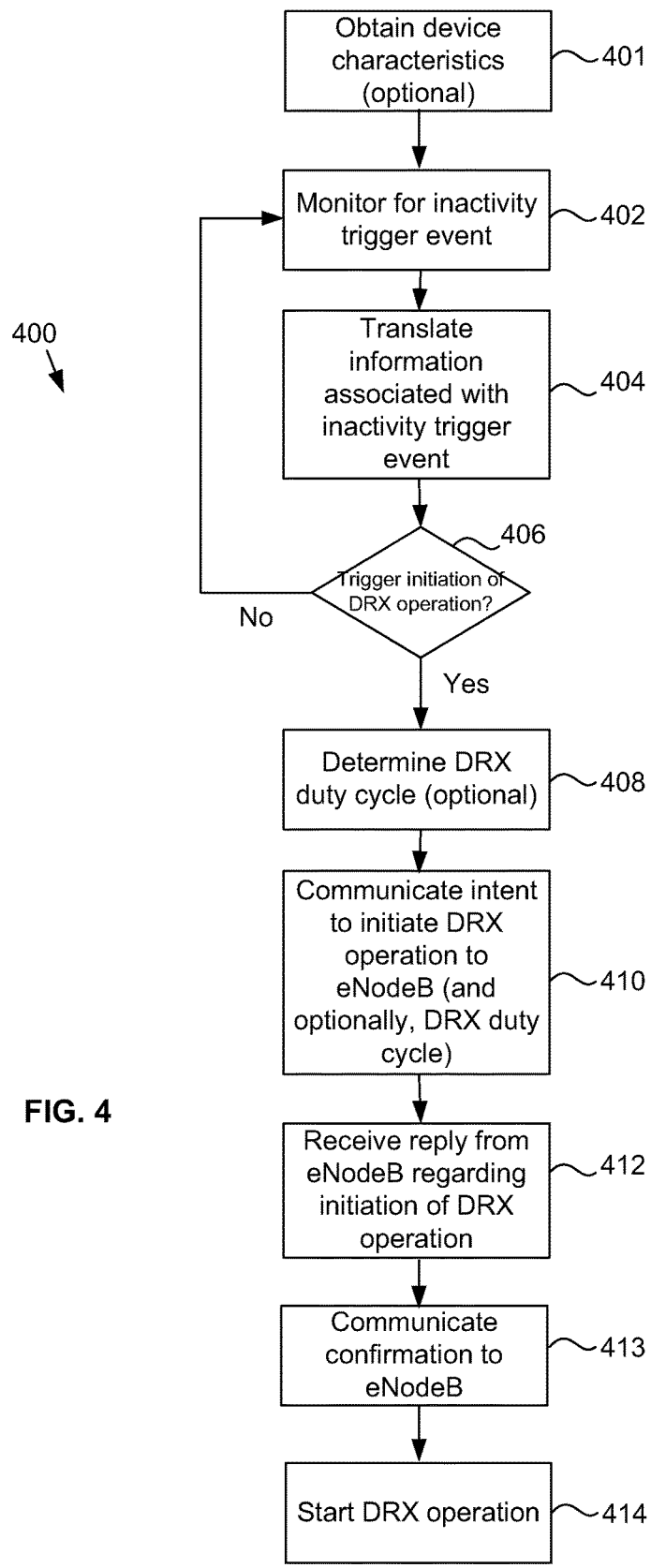
FIG. 4 illustrates an example flow diagram for an UE to initiate DRX operation based on application operation information according to some embodiments.
Figure 5:
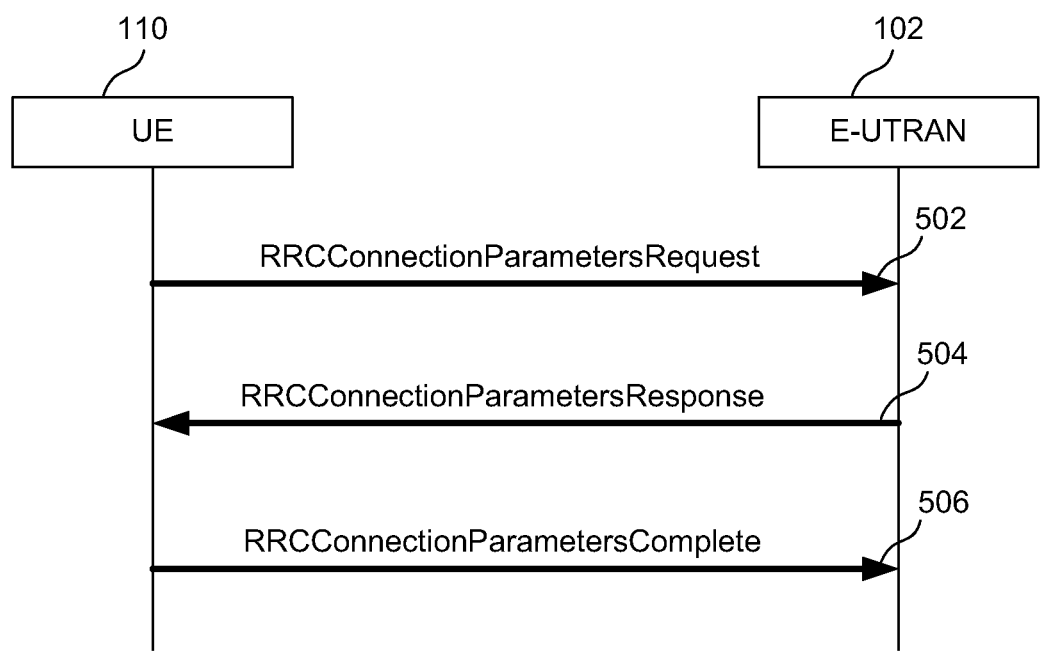
FIG. 5 illustrates an example timing diagram for UE initiation of DRX operation using RRC signaling according to some embodiments.

FIG. 4 illustrates an example flow diagram 400 for a UE 110 to initiate DRX operation based on its application operation information according to some embodiments—as opposed to eNodeB 102 initiating the DRX operation for the given UE 110 using a statically assigned inactivity timer under the current specification. FIG. 5 illustrates an example timing diagram for UE initiation of DRX operation using radio resource control (RRC) signaling according to some embodiments. FIG. 4 is described below in conjunction with FIG. 5.

At a block 401, the UE 110 communicates with the eNodeB 102 to obtain information about its device characteristics from the HSS/HLR 302 via the MME/gateway 304 during the network attach procedure (in which the UE 110 establishes a connection session with the network). Device characteristics include, but are not limited to, delay tolerance of data to be sent or received by the UE 110 (such as delay tolerance associated with applications on the UE 110) and/or whether UE 110 is a machine-to-machine (M2M) type of device. The NAS layer 320 of the UE 110 requests the device characteristics information, and the received information is stored in the NAS parameters component 322.

Alternatively, block 401 may be optional if the NAS parameters component 322 already includes the device characteristics information.

At a block 402, the energy-aware event monitor component 316 (also referred to as the energy-aware event monitor, application event monitor, or application inactivity event monitor) included in the application layer 310 monitors applications running on the UE 110 to identify or predict one or more inactivity trigger events. An inactivity trigger event (also referred to as an inactivity event) comprises a time period when there can be no data packets received or sent for the UE 110 with minimal or no sacrifice of application performance, and thus amenable to power and signaling overhead conservation.

Inactivity trigger event includes, but is not limited to:

An application end-of-session—When a current application session (e.g., an instant messaging (IM) chat, a Skype call, a streamed movie, a web-based meeting, etc.) ends, the UE 110 can decide based on the status of other applications and/or network traffic whether to initiate a DRX operation.

Periodicity of keep-alive messages associated with an application—Some of the most popular applications allow users to maintain an online "presence" and keep people on their contact list current as to their status. Examples of such applications include Facebook, Google chat, Microsoft Communicator, Skype, social networking websites, web-based chats, web-based news feeds, and the like. These applications use periodic short messages (also referred to as keep-alive messages) to keep content up-to-date. The UE 110 can use the known periodicity of the keep-alive messages to determine whether to initiate a DRX operation, to determine a DRX duty cycle, and/or to set a higher inactivity timer for going into RRC_Idle state. For instance, if the UE 110 knows that there will be keep-alive messages that will be transmitted to the eNodeB 102 at some periodicity, then the UE 110 can decide that the inactivity timer for going into RRC_Idle mode should be set to a time period greater than the periodicity of the keep-alive messages, or that the idle mode duty cycle should be selected so as to avoid interruption by the next keep-alive message during the "off" portion of the idle mode duty cycle (which requires excess signaling overhead in order to establish network re-entry).

Delay tolerance of application data transmission and/or reception—Different applications or different data types associated with a given application have different time sensitivity (or delay tolerance) for sending or receiving. For example, data associated with checking for software updates may be delay tolerant while data associated with sending a text message may not be delay tolerant. Delay tolerance can also be identified based on the type of device of the UE 110. M2M devices typically perform specific functions that do not require a user to interact with the device and only require a network connection for specific functions. A Smart Park meter is an example of a M2M device. This is in contrast to devices, such as smart phones, that are used by actual users and run multiple applications, each of the applications potentially having different quality of service requirements over the network. Another example of a M2M type of device may be an Internet-enabled refrigerator that is configured to access the network every Sunday morning at 1 AM to check for firmware updates or to access the network if/when a fault flag is switched on. In one embodiment the UE 110 is aware that it is a M2M type of device and its application requirements. In another embodiment the type of device and application requirements associated with the UE 110 are specified in another machine, such as the HSS/HLR 302, and may be obtained by the UE 110 (in block 401). The UE 110 can use the delay tolerance and/or M2M device type information to, for example, determine whether to initiate DRX operation, select an appropriate DRX duty cycle, and/or further extend the current DRX duty cycle, to save power if the performance of the application is not affected by delayed data transmission/reception.

The presence of the application-radio cross layer 312 allows the application(s) to communicate certain types of information which were previously unavailable to the RRC/MAC layer 314. At a block 404, the application-radio cross layer 312 translates, processes, or otherwise uses the application information from the application layer 310 to generate (or finalize) inactivity trigger event information into a format useable by the RRC/MAC layer 314. For example, the application layer 310 can send an end-of-session data packet associated with an application which can be configured by the application-radio cross layer 312 for use by the RRC/MAC layer 314. The application-radio cross layer 312 comprises an application programming interface (API) and the implementation of the API functions.

The application-aware DRX trigger component 318 of the RRC/MAC layer 314 (also referred to as a radio layer) analyzes the inactivity trigger event information provided by the application layer 310 via the application-radio cross layer 312, information about all the applications running on the UE 110, network traffic information, the device characteristics information (e.g., delay tolerance and/or M2M device designation) from the NAS parameters component 322, and other relevant information to determine whether to trigger a DRX operation at a block 406. If a determination is made not to trigger DRX operation (no branch of block 406), then the application-aware DRX trigger component 318 waits for the next set of information from the application layer 310. Otherwise a determination is made to trigger DRX operation by the UE 110 (yes branch of block 406).

In the current technical specification, there is no application-radio cross layer 312. Data from the application layer is received by the RRC/MAC layer, but is not analyzed by the RRC/MAC layer. The RRC/MAC layer does not know the content of the received data packets, and merely readies the data packets for transmission to an eNodeB. In contrast, embodiments of the present disclosure include use of the energy-aware event monitor component 316 of the application layer 310, the application-radio cross layer 312, the application-aware DRX trigger component 318 of the RRC/MAC layer 314, and the NAS parameters component 322 of the NAS layer 320 for the UE 110 to negotiate DRX parameters for itself.

The application-aware DRX trigger 318 can also determine which DRX duty cycle to trigger based on the inactivity trigger event information (block 408). For example, if the UE 110 comprises a M2M type of device, a long DRX duty cycle may be appropriate. As another example, the DRX duty cycle may be selected to avoid interruptions during the "off" portion of the duty cycle by a keep-alive message. Alternatively, the UE 110 may not have the option to select a DRX duty cycle (if this is reserved for the eNodeB 102), in which case block 408 is optional.

Next at a block 410, the UE 110 signals to the eNodeB 102 an intent to trigger DRX operation and optionally, a particular DRX duty cycle, other DRX parameters, and other possible information relating to DRX operation such as application characteristics (collectively referred to as DRX parameters or the DRX related parameters). The signaling may comprise a handshake, request, confirmation, notification, or synchronization procedure with the eNodeB 102 prior to actually going into DRX mode.

In response to the intent signaled by the UE 110, the eNodeB 102 can confirm, modify, or reject all or a portion of the DRX intent suggested by the UE 110 at a block 412. The eNodeB 102 can specify one or more DRX parameters different from that recommended by the UE 110 at the block 410. In any case, the UE 110 receives a reply/command from the eNodeB 102 regarding going into DRX mode at a block 412. The UE 110, in turn, communicates a confirmation to the eNodeB 102 that the eNodeB's reply/command has been received at a block 413. Lastly, at a block 414, the UE 110 switches to DRX operation mode in accordance with the DRX parameters finalized by the eNodeB 102.

In one embodiment of blocks 410, 412, and 413, new radio resource control (RRC) signaling is used for the UE 110 to negotiate DRX parameters for itself with the eNodeB 102. As shown in FIG. 5, the new RRC signaling comprises RRCConnectionParametersRequest, RRCConnectionParametersResponse, and RRCConnectionParametersComplete messages. The new RRC signaling information is included in one or more radio frames. The UE 110 generates and transmits an RRCConnectionParametersRequest message to the eNodeB 102 to signal its intent to initiate DRX operation (communication 502). The RRCConnectionParametersRequest message includes information elements (IEs) corresponding to DRX related parameters (as decided by the UE 110 in accordance with its end-of-session, periodicity of keep-alive messages, delay tolerance, and/or type of M2M device information) and provisions for other values/settings/parameters that the DE 110 may suggest to the eNodeB 102. As an example, the RRCConnectionParametersRequest message can include the DRXConfig parameters which are defined as DRX-Config IE in 3GPP TS 36.331 Version 10.0.0, E-UTRA Radio Resource Control (RRC): Protocol Specification (Release 10), January 2011, including variations and evolutions thereof.

In response, the eNodeB 102 transmits an RRCConnectionParametersResponse message to the UE 110, which comprises a confirmation, modification, or rejection of the DRX related parameters suggested by the UE 110 (communication 504). The RRCConnectionParametersResponse message also comprises the DRX related parameters specified by the eNodeB 102, which may or may not be the same as one or more of the DRX related parameters suggested by the UE 110 in communication 502 in accordance with the confirmation, modification, or rejection decision by the eNodeB 102. The DRX related parameters included in the RRCConnectionParametersResponse message can be defined, for example, as the DRX-Config IE set forth in 3GPP TS 36.331 Version 10.0.0, E-UTRA Radio Resource Control (RRC): Protocol Specification (Release 10), January 2011, including variations and evolutions thereof. In some embodiments, the DRX related parameters included in the RRCConnectionParametersResponse message may comprise just the parameter(s) that are different from those suggested by the UE 110 since the UE 110 is already in possession of the remaining parameters.

Last, the UE 110 returns a RRCConnectionParametersComplete message to the eNodeB 102 confirming successful receipt of the RRCConnectionParametersResponse message, including the DRX related parameters set forth by the eNodeB 102 (communication 506). When there is a difference in the DRX related parameters between those suggested by the UE 110 and the response by the eNodeB 102, the DRX related parameters set forth by the eNodeB 102 in the RRCConnectionParametersResponse message controls.

In an alternative embodiment of blocks 410, 412, and 413, the existing RRC signaling mechanism for reestablishing connection with the network is extended to provide the UE-suggested DRX related parameters to the eNodeB 102. Reestablishment of network connection is initiated by the UE 110 when some kind of network connection failure occurs such as during handover or if there is an emergency. The re-establishment procedure is initiated by the UE 110 generating and transmitting to the eNodeB 102 a RRCConnectionReestablishmentRequest message via radio frame(s) that includes a re-establishment connection request (as is conventionally done) and also at least the DRX related parameters (e.g., DRX-Config IE) that are self-determined by the UE 110. The rest of the re-establishment procedure involves re-establishing all of the RRC connections as described in 3GPP TS 36.331 Version 10.0.0, E-UTRA Radio Resource Control (RRC): Protocol Specification (Release 10), January 2011, including variations and evolutions thereof. Similar to the embodiment above, if there is a difference in the DRX related parameters between the UE 110 and eNodeB 102 after the UE-suggested DRX related parameters are provided to the eNodeB 102, those from eNodeB 102 controls.

Flow diagram 400 can be repeated for each UE 110 associated with the eNodeB 102, in order for each of the UEs 110 to self-determine and recommend when to go into idle mode or DRX operation instead of the eNodeB 102. In some embodiments, the flow diagram 400 can be implemented for the UE 110 to suggest one or more changes in its DRX parameters based on its applications and/or device characteristics.

Accordingly, a new DRX triggering mechanism is described herein that takes advantage of the real-time application information of the UE 110 itself to self-determine optimal triggering of DRX operation, rather than having the eNodeB 102 statically assign an inactivity timer to the UE 110 to trigger DRX mode as is currently done. The UE 110 possesses more and better information about its network traffic needs than the eNodeB 102. Applications running on the UE 110 have certain characteristics or events—such as an application end-of-session, application keep-alive messages, and/or delay tolerance of application data—which are monitored by the energy-aware event monitor component 316 included in the application layer 310. Such application information, in turn, are processed or translated by the application-radio cross layer 312 into a form accessible by the application-aware DRX trigger component 318 of the RRC/MAC layer 314. A NAS parameters component 322 of the NAS layer 320 also provides device characteristic information—such as device data delay tolerance and/or M2M device type information—to the application-aware DRX trigger component 318. The application-aware DRX trigger component 318 analyzes the application information and/or the device characteristic information to determine whether to initiate DRX operation and optionally, which DRX duty cycle or other DRX parameters to implement. The UE 110 sends a request to the eNodeB 102 seeking approval or confirmation to trigger DRX operation (and optionally a particular DRX duty cycle). When the eNodeB 102 responds (e.g., agreement, modification, or rejection of the DRX parameters suggested by the UE 110), UE 110 starts DRX operation in accordance with the response by the eNodeB 102.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the spirit and scope of the invention.

The Abstract of the Disclosure is provided to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for initiating discontinuous reception (DRX) operation by a user equipment (UE) operating in a wireless communications network, the method comprising:
    Monitoring applications running on the UE to identify at least one inactivity trigger event associated with at least one of the applications;
    Determining, by the UE, to initiate the DRX operation based on the identified inactivity trigger event and device characteristics information associated with the UE;
    Signaling the device characteristics to a non-access stratum (NAS) through NAS parameters, wherein the device characteristics comprise delay tolerance of data to be sent or received by the UE and identification of the UE as a machine-to-machine (M2M) type of device executing an M2M type of application and the device characteristics are obtained from a home subscriber server (HSS) or home location register (HLR) via a mobility entity (MME) gateway; and
    Communicating by the UE to an enhanced node B (eNodeB) initiation of the DRX operation prior to the UE switching to the DRX operation;
    Wherein the monitoring is performed in an energy-aware event monitor component of a UE application layer and the determining is performed in an application-radio cross layer application programming interface (API), included in a protocol stack of the UE, for translating application information from an application layer into a format usable by one or more of a radio resource control (RRC) layer and medium access control (MAC) layer, wherein the energy-aware event monitor component, the application-radio cross layer, an application-aware DRX trigger component of the one or more of a radio resource control (RRC) layer and medium access control (MAC) layer, and the NAS parameters are used by the UE in negotiating DRX parameters for the DRX operation.

2. The method of claim 1, wherein the inactivity trigger event comprises at least one of an end-of-session associated with the at least one of the applications, keep-alive messages associated with the at least one of the applications having a certain periodicity, or delay tolerance characteristics of the at least one of the applications.

3. The method of claim 1, further comprising determining, by the UE, a DRX duty cycle for the DRX operation based on the identified inactivity trigger event and the device characteristics information, and wherein the communicating to the eNodeB includes communicating the determined DRX duty cycle to the eNodeB.

4. The method of claim 1, wherein the communicating to the eNodeB comprises transmitting at least one radio frame including a radio resource control (RRC) message, the RRC message including at least one DRX parameter relating to the initiation of the DRX operation.

5. The method of claim 1, wherein the UE is configured for operation within a 3rd Generation Partnership Project (3GPP)-long term evolution (LTE) network.

6. The method of claim 1, wherein the communicating to the eNodeB is performed at a radio layer over an air interface.

7. A user equipment (UE) comprising:
A processor to initiate triggering a discontinuous reception (DRX) operation, wherein the processor initiates triggering the DRX operation based on at least an inactivity event associated with at least one application running on the UE and at least one non-access stratum (NAS) parameter associated with the UE, the processor further to signal device characteristics to an NAS through the NAS parameters, wherein the device characteristics comprise delay tolerance of data to be sent or received by the UE and identification of the UE as a machine-to-machine (M2M) type of device or executing an M2M type of application and the device characteristics are obtained from a home subscriber server (HSS) or home location register (HLR) via a mobility management entity (MME) gateway, the processor further to negotiate DRX parameters for the DRX operation based on an energy-aware event monitor component of a UE application layer, an application-radio cross layer application programming interface (API) for translating application information from an application layer into a format usable by one or more of a radio resource control (RRC) layer and medium access control (MAC) layer, an application-aware DRX trigger component of the RRC/MAC layer, and the at least one NAS parameter; and
A transceiver in communication with the processor, the transceiver to signal to an enhanced node B (eNodeB) using at least one radio frame an intent to trigger the DRX operation based on the negotiated DRX parameters.

8. The UE of claim 7, wherein the UE is configured for operation within a 3rd Generation Partnership Project (3GPP)-long term evolution (LTE) network operating in a time division duplex (TDD) mode.

9. The UE of claim 7, wherein the UE is configured for operation within a 3rd Generation Partnership Project (3GPP)-long term evolution (LTE) network operating in a frequency division duplex (FDD) mode.

10. The UE of claim 7, wherein the inactivity event comprises one or more of an end-of-session associated with the at least one application, keep-alive messages associated with the at least one application having a certain periodicity, and a delay tolerance characteristic of the at least one application.

11. The UE of claim 7, wherein the processor determines one or more DRX parameters associated with the DRX operation based on the inactivity event and the NAS parameter, the DRX parameters including a DRX duty cycle.

12. The UE of claim 7, wherein the signal to the eNodeB comprises a radio resource control (RRC) signaling included in the at least one radio frame, the RRC signaling including one or more DRX parameters corresponding to the DRX operation.

13. The UE of claim 7, wherein the transceiver receives a return signal from the eNodeB in response to the intent to trigger the DRX operation, and wherein the transceiver starts the DRX operation in response to the return signal.

14. The UE of claim 13, wherein the return signal comprises a modification of at least one DRX parameter corresponding to the DRX operation.

15. A user equipment (UE) operating in a 3rd Generation Partnership Project (3GPP)-long term evolution (LTE) network, comprising:
A processor to identify in an application layer of a protocol stack an inactivity event associated with at least one application running on the UE, wherein the processor processes in an application-radio cross layer of the protocol stack the inactivity event for access by a radio layer, the application-radio cross layer configured to translate application information from the application layer into a format usable by one or more of a radio resource control (RRC) layer and medium access control (MAC) layer and wherein the processor determines in the radio layer one or more discontinuous reception (DRX) operation parameters in accordance with an energy-aware event monitor component of the application layer, the application-radio cross layer, the inactivity event, and non-access stratum (NAS) parameters, the processor further to signal device characters to an NAS through the NAS parameters, wherein the device characteristics comprise delay to tolerance of data to be sent or received by the UE and identification of the UE as a machine-to-machine (M2M) type of device or executing an M2M type of application and the device characteristics are obtained from a home subscriber server (HSS) or home location register (HLR) via a mobility management entity (MME) gateway.

16. The UE of claim 15, wherein the inactivity event comprises a time period in which no data packets are received or sent for the UE.

17. The UE of claim 15, wherein the processor determines in the radio layer a DRX duty cycle in accordance with the inactivity event and the NAS parameters.

18. The UE of claim 15, further comprising a transceiver in communication with the processor, the transceiver to transmit to an enhanced node B (eNodeB) at least one radio frame including a radio resource control (RRC) signaling, wherein the RRC signaling includes the one or more DRX operation parameters determined in the radio layer.

19. The UE of claim 18, wherein the RRC signaling is used for re-establishing a connection with the network.

20. The UE of claim 15, wherein the UE is configured for operation within the 3GPP-LTE network operating in a time division duplex (TDD) mode or a frequency division duplex (FDD) mode.

* * * * *

UNITED STATES PATENT AND TRADEMARK OFFICE
CERTIFICATE OF CORRECTION

PATENT NO. : 9,713,164 B2
APPLICATION NO. : 14/127805
DATED : July 18, 2017
INVENTOR(S) : Gupta et al.

Page 1 of 1

It is certified that error appears in the above-identified patent and that said Letters Patent is hereby corrected as shown below:

On page 2, in Column 2, under "Other Publications", Line 21, delete "Fianl" and insert --Final-- therefor On page 2, in Column 2, under "Other Publications", Line 21, delete "Mar. 18, 205"," and insert --Mar. 18, 2015",-- therefor On page 2, in Column 2, under "Other Publications", Line 22, delete "Examiners" and insert --Examiner's-- therefor On page 2, in Column 2, under "Other Publications", Line 25, delete "Examiners" and insert --Examiner's-- therefor On page 3, in Column 1, under "Other Publications", Line 3, delete "2014-7002377,Response" and insert --2014-7002377, Response-- therefor Signed and Sealed this
Tenth Day of April, 2018

Andrei Iancu
*Director of the United States Patent and Trademark Office*